United States Patent [19]

Losi

[11] Patent Number: 4,861,049
[45] Date of Patent: Aug. 29, 1989

[54] MOBILE BANK TELLER UNIT

[75] Inventor: Paul F. Losi, Toms River, N.J.

[73] Assignee: Chemical New York Corporation, New York, N.Y.

[21] Appl. No.: 546,721

[22] Filed: Oct. 28, 1983

[51] Int. Cl.⁴ .............................................. B62B 1/12
[52] U.S. Cl. ................................ 280/47.16; 180/275; 188/167; 280/43.2; 280/840; 296/26; 296/27; 296/56; 296/171; 296/175; 312/250
[58] Field of Search ............ 312/250; 109/1 R, 44–47, 109/15, 23; 52/67; 180/275; 296/165, 171–173, 175–176, 26, 27, 56; 188/20, 21, 166, 167; 280/43.2, 47.16, 6 R, 7

[56] References Cited
U.S. PATENT DOCUMENTS 2,803,307  8/1957  Ferrer ................................. 280/43.2
2,995,398  8/1961  Davenport ........................... 296/26
4,513,670  4/1985  Berman ................................. 52/67

Primary Examiner—Charles A. Marmor
Assistant Examiner—Eric Culbreth
Attorney, Agent, or Firm—Davis Hoxie Faithfull & Hapgood

[57] ABSTRACT

A mobile bank teller unit includes a cabinet supported by a pair of main wheels having automatic brakes. Vertically adjustable caster pairs at each end provide sidewise mobility. The cabinet opens to form an enclosure for two tellers, each having complete bank transaction equipment. Two banking customers can be accommodated simultaneously. The unit closes into a compact, secure portable form.

2 Claims, 2 Drawing Sheets

MOBILE BANK TELLER UNIT

BACKGROUND

Traditionally, banking services such as depositing, withdrawing, check cashing, loan payments, and the like are carried out solely within the premises of the bank. In recent years the expansion of these banking activities has led to the establishment of miniature branch offices to bring the services of the bank closer to the customer. The bank leases space and staffs the miniature branch at the appropriate times to provide banking services. Another recent approach has been to send a guarded, roving cashier through office buildings and manufacturing facilities to cash checks and handle simple transactions on pay days. Both miniature branches and roving cashiers have limitations. The miniature branch requires costly equipment and leased space. The roving cashier is out of communication with the bank and unable to verify account balances and the like.

SUMMARY OF INVENTION

The present invention permits expansion of customer services by bringing the bank to the customer without the need to lease and equip permanently allocated space. The present invention is a compact wheeled mobile teller unit which provides automated dual teller stations each equipped with complete teller data terminals, cash dispensers, coin dispensers, and storage provisions for the necessary forms and slips. The mobile unit can be wheeled through buildings, transported on passenger elevators and put into direct data communication with the bank itself via telephone connection. Complete teller/customer services are provided when and where needed. The mobile unit is designed to collapse when not in use, to occupy minimal storage space and to be secure against theft.

The mobile bank teller unit of the present invention is a rectangular cabinet on wheels. One side is provided with the equipment and facilities needed for two banking customers and the other side is provided with the equipment and facilities needed for two bank tellers. The teller side expands to provide an enclosed space for the tellers. The customer side is closed by disappearing tambour doors. The unit is supported in the travel mode by a central main pair of pneumatic tire wheels. A pair of hard rubber caster wheels is located at each end. Each end pair of casters is associated with the vehicle chassis by a jack mechanism which permits the end caster pairs to be raised or lowered independently. When both caster pairs are lowered sufficiently, the unit is lifted from the central main wheels to permit it to be maneuvered in any direction to be positioned for use or storage. The independently adjustable caster pairs permit the unit to be leveled. Push/pull bars located at each end are linked to a hydraulic brake system for the center wheels such that the brake is applied automatically when the push/pull bars are released. The case is constructed of metal and wood finished with suitable metal or plastic laminate.

THE DRAWINGS

In the drawings;

FIG. 1 is an elevational view of the customer side of the mobile teller unit of the present invention showing the end to the left opened for business, FIG. 2 is a plan view of the unit of FIG. 1 divided along the center line to show the end to the left closed and the end to the right opened, FIG. 3 is an elevational view in section taken along line III—III of FIG. 2, and FIG. 4 is an elevational view of the end showing the unit opened.

DETAILED DESCRIPTION

Figure 1:
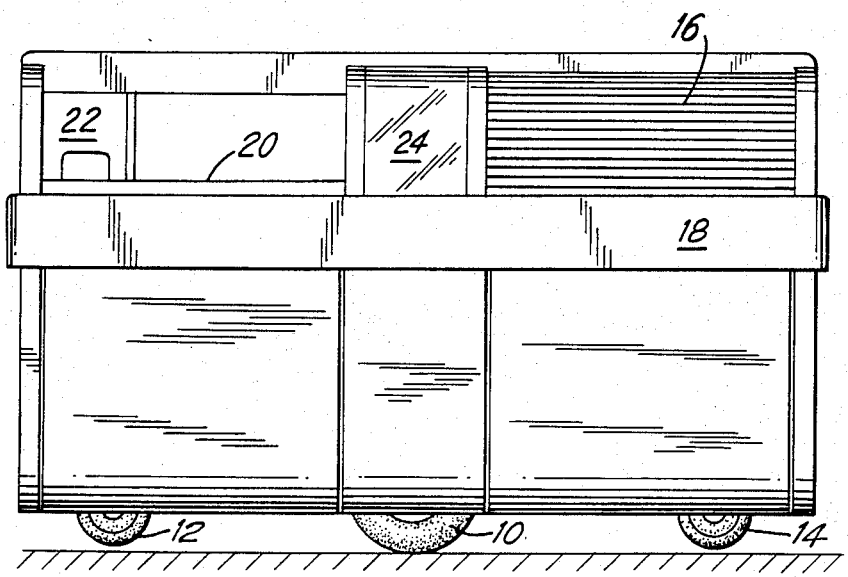

FIG. 1 shows the exterior appearance of the mobile teller unit of the present invention. The end to the left of FIG. 1 is shown open for customer service and the end to the right is shown closed for transport or storage. The unit is mounted upon a central pair of pneumatic tire main wheels and the ends of the unit are supported by pairs of hard, rubber wheeled casters 12, 14. The caster pairs 12, 14 are associated with the unit by adjustable jack mechanisms which permit leveling of the unit when stationed and permit lifting the unit off the main wheels to allow maneuverability for positioning of the unit.

The end to the right of FIG. 1 is closed by a sliding tambour door 16 which, in the manner of a roll top desk, comprises parallel slats which slide in track slots and roll into a cylinder for storage when opened. The end to the left is open for customer service with the tambour door rolled down out of slight thereby revealing to the customer a counter top surface 20 and an automatic coin dispenser output 22. Behind a curved window 24 is an automated cash dispenser. A resilient bumper band 18 encompasses the unit.

Figure 2:
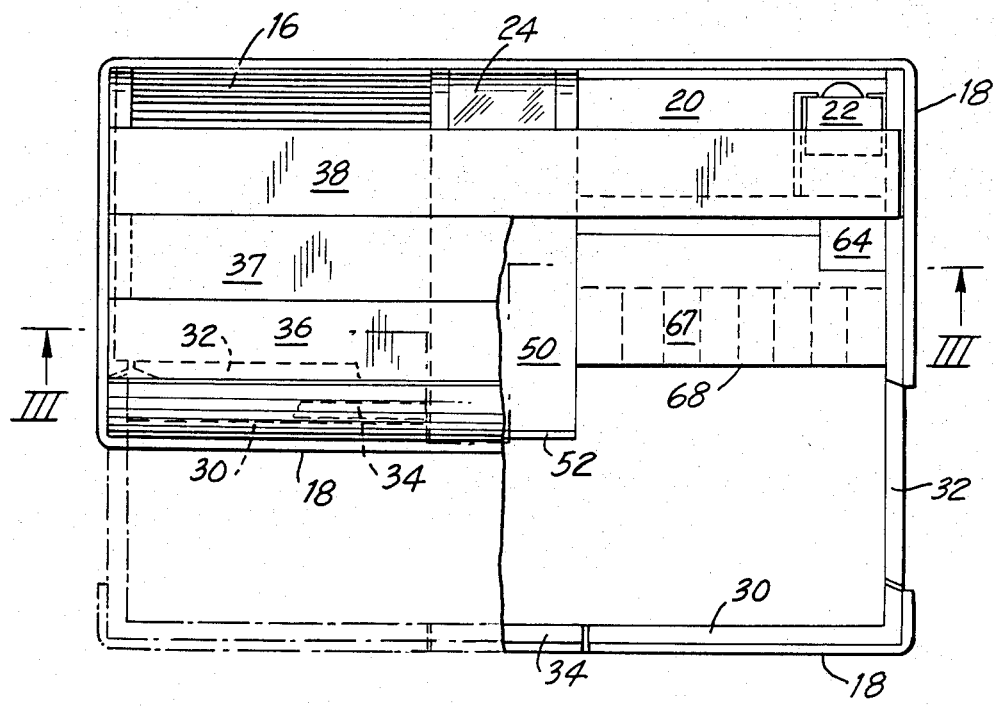
Figure 4:
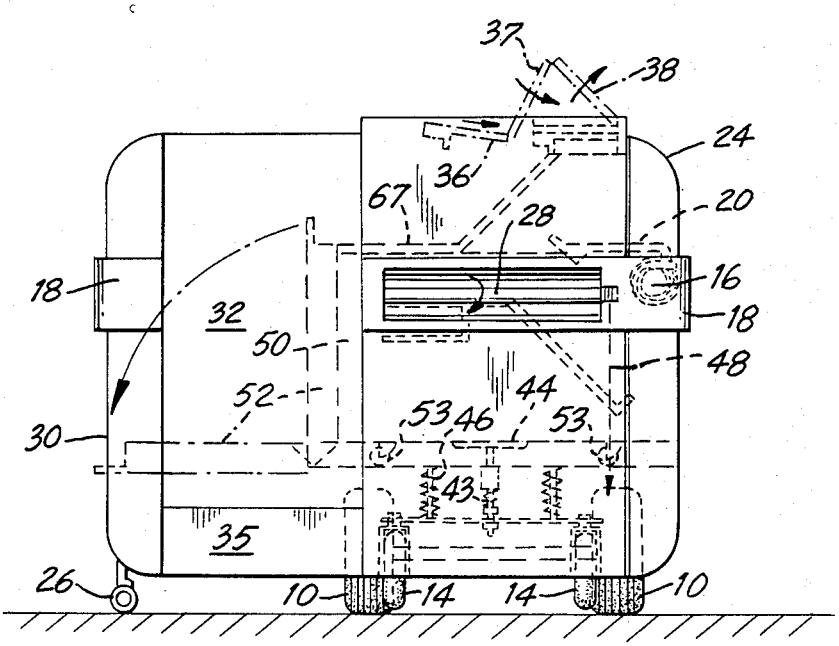

The right end of FIG. 2 shows, in plan view, the unit open for customer service, whereas the left end of FIG. 2 shows the unit closed for storage or transport. FIG. 4 shows, in elevation, the opened right end. A rear wall panel 30 is extended away from the unit about two feet to provide an enclosure for the bank tellers. The panel 30 extends away from the cabinet on sliding rails 35 and is supported by vertically adjustable casters 26. Hinged end panels 32 are unfolded from a storage position parallel with the rear panel 30 and serve as access doors to the teller enclosure. A central door 34 unfolds from a storage position flat against the rear panel 30 to complete the teller enclosure. Three similar top panels 36-38 are hinged to bifold into a stack toward the front of the unit to store nested and to serve as further counter surface. The manner of folding and storage of top panels 36-38 is shown in phantom outline in FIG. 4 as is the rolled up tambour door 16. The central door 34 permits access to and removal of cash dispenser 50 which can slide rearwardly on wheeled tracks for removal or replenishment.

The left end of FIG. 2 shows the unit closed for storage or transport. End panel 32 has been folded parallel with rear panel 30 as has the central door 34. Rear panel 30 has been retracted against the unit and latched into locked closure. Top panels 36-38 have been unfolded from their nested storage position and close the top. Tambour door 16 has been raised from its rolled storage position beneath counter 20 and closes the customer service side of the unit. The central aperture in the rear panel 30, opened by central door 34, is filled with the now exposed end 52 of the cash dispenser mechanism 50. The wheeled track assembly 53, 54 of cash dispenser 50 can be seen in FIG. 3. FIG. 4 also shows in phantom outline how the end closure 52 of the cash dispenser 50 swings down on hinges to a horizontal position to form an extension of the wheel track 54 to permit the cash dispenser 50 to be withdrawn along the wheeled track 54 when the mobile bank teller unit is either opened or closed. End closure 52, in the manner of a drawbridge, extends track 54 through the aperture of the central door 34 to permit removal of or access to the cash dispenser 50.

Figure 3:
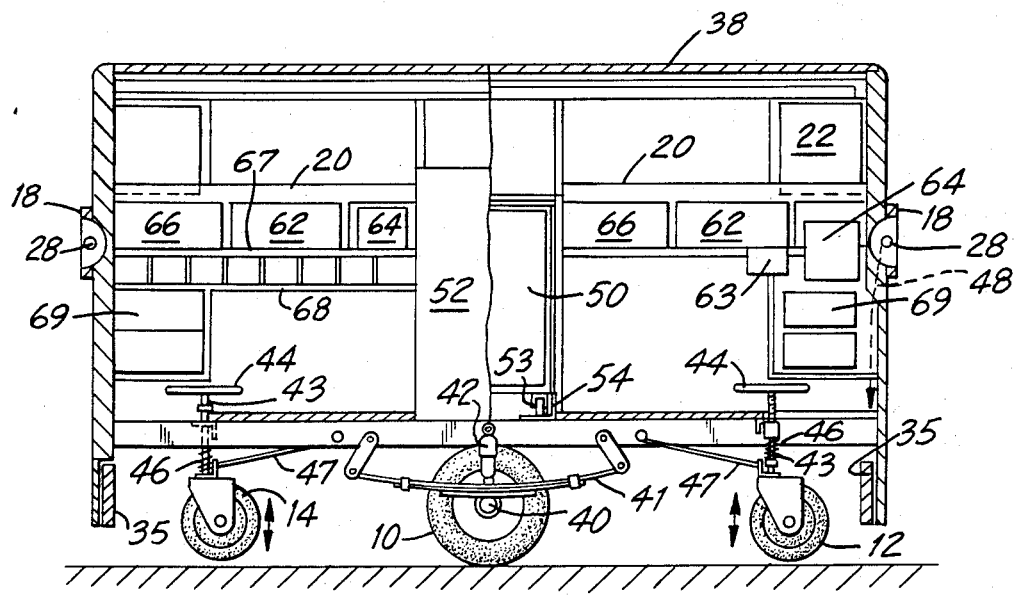

The wheels and suspension system which make the mobile teller unit transportable are best understood with reference to FIGS. 3 and 4. The main wheels 10 are on a central axle 40 suspended from leaf springs 41 with shock absorbers 42. End caster pairs 12, 14 are adjustable vertically by a jack screw 43 operated by a handwheel 44 shown for convenience as affixed directly to the screw 43. The use of shafts and bevel gears permit the handwheels to be located on the exterior ends of the unit if desired. Coil springs 46 cushion the caster wheels. Trailing arms 47 prevent twisting of the caster pairs 12, 14. For transport the caster pairs 12, 14 are raised to be an inch or so above the floor thereby making easy the maneuvering of the unit. To move the unit sideways, the caster pairs are lowered to lift the main wheels 10 from the floor. The unit then can be pushed in any direction for exact positioning. When stationed, the independently adjustable caster pairs 12, 14 serve to level and stabilize the unit.

Main wheels 10 are provided with hydraulic brakes actuated by a spring biased master cylinder of normal automobile character. The brake actuating spring is retracted by a cable 48 wound winch fashion about the end of a push/pull bar 28 on each end of the unit. The push/pull bar is located in a recess in the bumper band 18. To release the brake, the bar 28 is rotated to wind up and tension the cable 48 to overcome the spring bias of the brake system master cylinder. Release of the push-/pull bar 28 allows the spring to set the brakes automatically, thereby preventing accidental travel of the unit.

Within the mobile teller unit are complete banking facilities for two tellers to serve two customers simultaneously. The equipment includes one automated "Inter Innovation" brand cash dispenser 50 central of the unit and accessible to both tellers. Each teller station has a "Triad" brand automated coin dispenser 22 arranged with the output accessible to the customer. Each teller station is provided with a "Teletron T 100" teller terminal comprising keyboards 62, 63, a validation/journal printer 64, a cathode ray tube display 66, and a microprocessor and each has a cashbox 69 with drawers. Compartmented storage 68 below each teller's counter surface 67 is provided for the forms and slips needed for banking transactions. Digital displays behind curved window 24 are viewable by the customers.

In the closed mode for storage and transport, the mobile teller unit is compact and is secure against tampering or theft. It is emptied of cash and the rear wall panel 30 is drawn tightly against the unit by interior hand actuated cam latches. The tambour doors 16 on the customer side are raised in their tracks by interior automotive window cranks. The top panels 36–38 are unfolded flat to close the top and are locked with a keyed panel lock.

What is claimed is:

1. A mobile bank teller unit comprising a generally rectangular cabinet having front and rear sides and a pair of ends, the cabinet having a central pair of main wheels and a pair of vertically adjustable caster wheels near each end, the adjustable caster pairs being adapted to raise the cabinet to remove the load from the main wheels for sidewise movement and being independently adjustable to permit leveling of the cabinet, the front side of the cabinet being adapted to serve banking customers and the rear side being adapted to accommodate bank tellers, the customer service side having at least one opening for the service of customers with a track slot at either side of the opening and being closeable by tambour doors comprising parallel slats which are movable from storage to slide in the track slots, the bank teller side including an enclosure for the tellers, the teller enclosure being formed by an enclosure rear panel parallel to and spaced from the rear side of the cabinet and two enclosure end panels parallel to and extending from the ends of the cabinet to the enclosure rear panel, the enclosure end panels being foldable for storage parallel to the rear side of the cabinet, the enclosure rear panel being moveable toward the rear side of the cabinet for storage and to thereby form the rear wall of the cabinet when closed, additional, vertically adjustable casters wherein the rear panel is extended away from the cabinet to form the teller enclosure on roller slides and is supported by the vertically adjustable casters, wherein the enclosure end panels are access doors for the teller enclosure, and wherein the enclosure rear panel includes a central hinged door for access to an automated cash dispenser.

2. The mobile bank teller unit of claim 1 wherein the customer service side accommodate two customers simultaneously and the teller enclosure accommodates two bank tellers.

* * * * *